Aug. 14, 1951   W. M. HARKS   2,564,623
HOSE RETRIEVING MECHANISM
Filed April 3, 1948   2 Sheets-Sheet 1
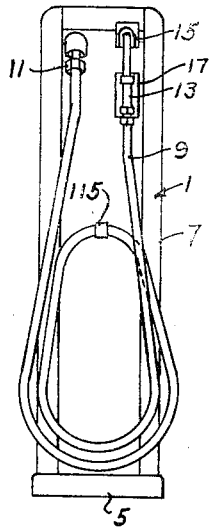
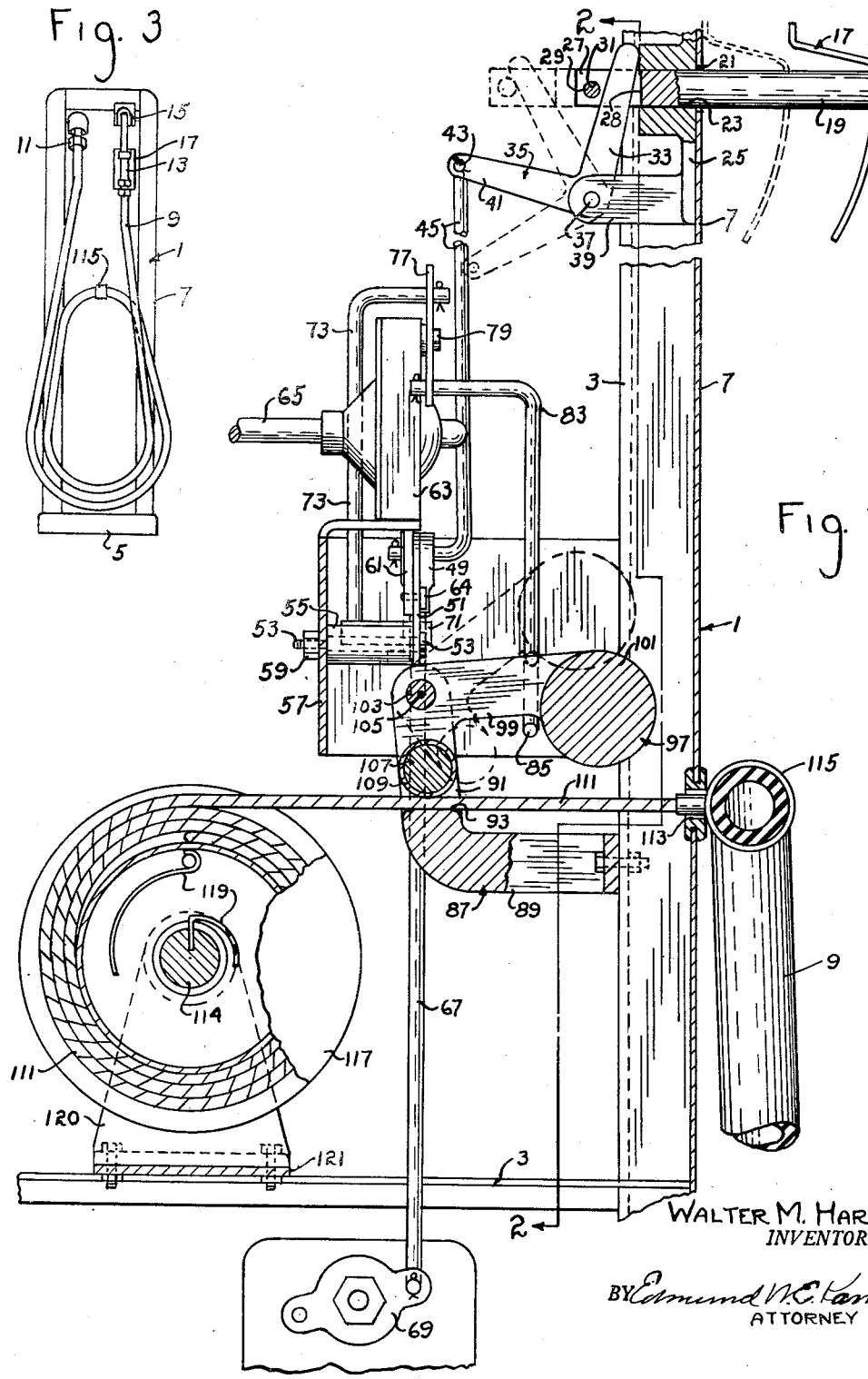
Walter M. Harks
INVENTOR.

Aug. 14, 1951   W. M. HARKS   2,564,623
HOSE RETRIEVING MECHANISM
Filed April 3, 1948   2 Sheets-Sheet 2
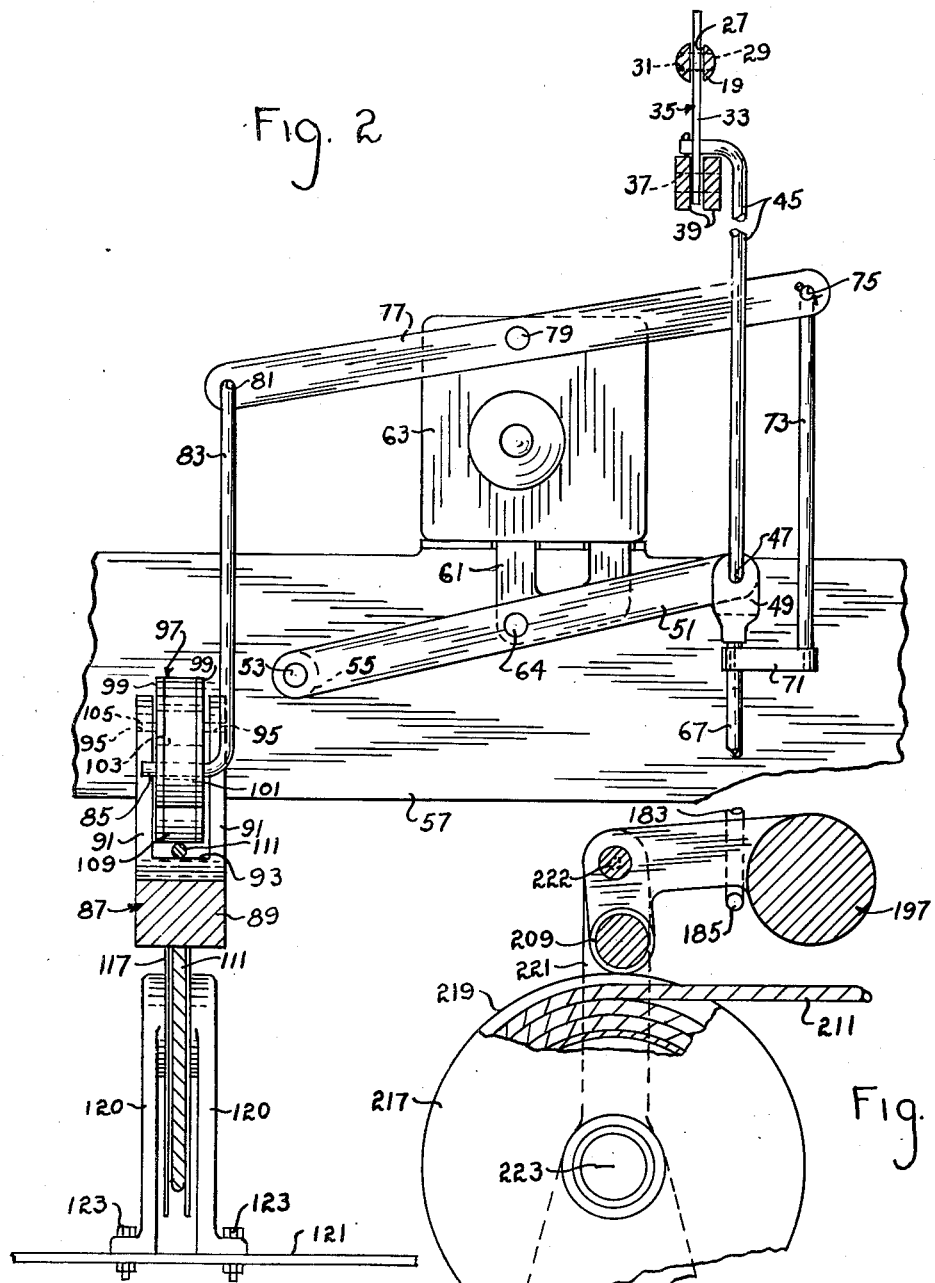
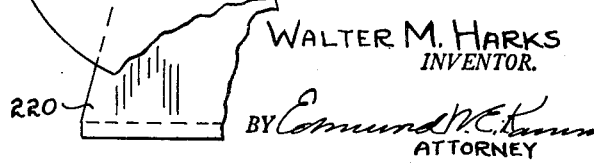
WALTER M. HARKS
INVENTOR.
BY
ATTORNEY Patented Aug. 14, 1951

2,564,623

UNITED STATES PATENT OFFICE 2,564,623

HOSE RETRIEVING MECHANISM

Walter M. Harks, Fort Wayne, Ind., assignor to Bowser, Inc., Fort Wayne, Ind., a corporation of Indiana Application April 3, 1948, Serial No. 18,770

13 Claims. (Cl. 299—77)

This invention relates to a hose retrieving mechanism; more particularly, it relates to a hose retrieving mechanism for a gasoline dispensing pump and latching means for arresting said retrieving mechanism.

It is an object of this invention to provide means for extending a hose beyond its free length.

It is another object of this invention to provide a hose retrieving mechanism.

Another object of this invention is to provide a hose retrieving mechanism and latching means for arresting said retrieving mechanism.

A further object of this invention is to provide a hose retrieving mechanism for a gasoline dispensing pump and to provide latching means for arresting the retrieving mechanism, said latching means being interconnected to be operated by the motor switch and interlock actuating lever on said dispensing pump.

Still another object of the invention is to provide a cable which is attached at one end to the intermediate portion of the hose.

Yet another object of the invention is to provide a reeling means for the other end of the cable.

It is still another object of the invention to attach a cable or other member to an intermediate portion of the hose to provide means for retracting the member.

A further object of the invention is to provide a retrieving mechanism as described, together with means to prevent the retrieving of the hose until the motor switch is opened.

These and other objects will become apparent from a study of this specification and the drawings which are attached hereto and are made a part hereof, and in which:

Figure 1 is a sectional view of a gasoline dispensing pump showing the dispensing hose, the extending and retrieving means for said hose and the latching mechanism.

Figure 2 is a view taken on the line 2—2 of Figure 1 showing the interlock and latch operating mechanisms.

Figure 3 is a view of a gasoline dispensing pump showing the hose and nozzle on the pump in their normal, restored positions.

Figure 4 is a modified form of the latching mechanism showing the latch engaging the cable reel.

Referring to Figures 1, 2 and 3 of the drawings, the numeral 1 designates a gasoline dispensing pump in general having a frame 3 mounted upon a base 5 and a housing 7 enclosing the frame. A liquid discharge hose 9 is connected to the pump in the conventional manner as shown at 11 (Fig. 3) and terminates in a discharge nozzle 13. A nozzle boot 15 and a hose hook 17 are provided on the pump to support the nozzle. The hose hook shown is that disclosed in Patent Number 2,405,264 issued August 6, 1946, to H. E. Marvel and has a reciprocating motion, although any of the types commonly employed in the art may be used.

The hose hook is so constructed that when it is in the "switch on" position the hose nozzle cannot be hung up on it but when it is returned to the "switch off" position, it will receive and support the nozzle.

A rod 19, forming a part of the hose hook, extends through a hole 21 in the housing and through a bearing 23 in a bracket 25 and has a slot 27 in the end which is inside the housing. A shoulder 28 and a pin 29 in hole 31 in the rod form stops. One leg 33 of a bell crank 35 is inserted in the slot 27 between the pin 29 and the shoulder 28. Pin 37, which extends through a bifurcated projection 39 extending inward from the bracket 25, serves as a fulcrum for crank 35. The other leg 41 of the bell crank has a hole 43 formed therein which receives a rod 45 which extends downward to engage a hole 47 in the clevis 49 and a similarly aligned hole in the interlock lever 51.

The interlock lever is pivoted upon a shoulder screw 53 which extends through a spacer 55 and a member 57 which is fastened to the frame 3 and carries nut 59. A seeker 61, having two legs extending upward into the interlock case 63, is pivotally mounted on a pivot 64 at approximately the middle of lever 51. The interlock is connected to the register reset mechanism (not shown) by the shaft 65 and is fully disclosed in the United States Patent Number 2,299,894 issued to Clement P. Griffith on October 27, 1942.

A rod 67 extends downward from the clevis 49 to connect with the motor switch 69.

A link 71 is fixed to the rod 67 directly below the clevis and to a rod 73 which extends upwardly to engage a hole 75 in the latch operating lever 77 which is pivotally mounted at its midpoint 79 to the interlock case. The other end of the lever 77 has a hole 81 to receive the latch rod 83 which extends downwardly and has a part 85 bent at right angles to its main portion and so positioned as to pass under the movable portion of the latch assembly 87.

The latch assembly comprises a bracket 89 fastened to the frame 3 and extending inwardly and upwardly and having the upper portion slotted to provide two legs 91 and a land 93 at the base of the legs. Aligned holes 95 are formed in each of the legs 91 near the top to receive pivot pin 105 for the latch 97.

The latch is formed of two, spaced bell cranks 99 held in spaced relationship by a weight 101 at the end of one leg, by a hub 103 which rides on the pivot pin 105 and is fixed at each end to the cranks and by the snubbing member 107 fixed to the lower ends of the legs. A roller 109 rides on the member 107. It will be noted that the pivot pin 105 is located to the left (Fig. 1) of the vertical centerline of member 107 when roll 109 forces cable 111 into contact with land 93.

One end of the cable 111 passes through a hole 113 in the housing 7 and is secured to a ring 115 which encircles the hose 9 about midway of its length. The other end of the cable is wound upon a reel 117 having an actuating spring 119 which is connected to the reel and a fixed member 114 so as to take up any slack in the cable. The reel is rotatably supported on brackets 120 which are mounted upon a plate 121, which in turn is anchored to the frame 3 by bolts and nuts 123.

Operation

To operate the dispensing pump the register is manually reset to clear the interlock mechanism. The hose nozzle is removed from the hose hook 17 which is then pulled outwardly to move the bell crank 35 in a clockwise direction (Fig. 1) and to move rods 45, 67 and 73 upwardly. The seeker 61 will be urged into the interlock case by lever 51 but such motion would have been prevented by the interlock mechanism had the resetting of the register not been first performed.

Rod 67 will move the motor switch 69 to its "on" position and lever 77 will pivot in a counterclockwise direction about 79 to lower the rod 83. End 85 of rod 83 will disengage the latch 97 permitting it to drop under the action of weight 101 so that roller 109 rests firmly upon the cable 111 and forces it against land 93. In this position any motion of the reel in a direction to rewind the cable will wedge the cable tightly between the roller and the land and arrest it. As the cable is drawn from the reel, the roller 109 and weight 101 will be lifted away from the land and the cable will pay out freely.

The hose 9 may be extended approximately one-half its length before withdrawing any cable from the reel but any further pulling on the hose will pull the cable from the reel against the action of spring 119. Thus cars situated beyond the radius of the single loop length representing approximately one-half the hose length can be serviced. The latch holds the cable in the extended position and relieves the operator from the strain of holding tension on the hose.

When the hose hook is pushed in again preparatory to hanging the nozzle thereon, the action of the linkages described above will be reversed and the end 85 of rod 83 will lift the latch from engagement with the cable to permit the spring 119 to rewind the cable upon the reel 117. This will retrieve the hose so that assuming that the nozzle 13 has been placed upon the hose hook, the hose will fall into a double loop, substantially as shown in Figure 3.

The actuation of the hose hook as just described moves rod 67 to open the motor switch 69 and stops the pump while the actuation of lever 51 withdraws seeker 61 so that the resetting mechanism will again have to be actuated before further liquid can be dispensed.

Modification

Figure 4 is a modified form of the apparatus disclosed in Figures 1 and 2. In this form the actuating mechanisms are the same as described above but instead of snubbing the cable against a land, the roller 209 of the latch 197 brakes the periphery of one of the side plates 219 of the reel.

In this form the reel 217, the cable 211 and the method of anchoring the cable to the reel and the hose remain unchanged; however, the reel supporting brackets 220 are extended upwardly as shown at 221 to support the pivot 222 for the latch. The rod 183 with its right-angled portion 185 corresponds to the rod 83 and the right-angled portion 85 shown in Figures 1 and 2.

Operation

The sequence of operation and the movement of the various parts described are identical with the description of operation for Figures 1 and 2, with the exception that the latch 197 contacts the periphery of the side plate 219 to halt the retrieving of the hose.

It will be seen that the distance the centers 222 and 223 is less than the sum of the distances from 222 to the remote surface of roll 209 and from 223 to the periphery of flange 219. Thus the reel will be free to rotate in a clockwise direction but upon a reverse rotation the weight will force roll 209 into snubbing relation with the flange. This action is in the nature of a toggle action and a great radial braking force is created. The roll 209 has a large internal diameter and does not act as an antifriction roll so that it will not rotate when it is in braking position.

It is obvious that various changes may be made in the form, structure and arrangement of parts without departing from the spirit of the invention. Accordingly, Applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a hose retrieving mechanism, the combination of a hose having a nozzle at one end and an inlet at the other, means for supporting the hose at its inlet and nozzle ends to form a loop, hose retrieving means attached to the hose intermediate the ends and having extended and retrieved positions, releasable means for holding said retrieving means in its extended position and means actuable by the hose supporting means for the nozzle end, for releasing said holding means.

2. In a hose retrieving mechanism, the combination of a hose having a nozzle at one end and an inlet at the other, means for supporting the hose at its inlet and nozzle ends to form a loop, hose retrieving means attached to the hose intermediate the ends and having extended and retrieved positions, said retrieving means comprising means for supporting said intermediate portion above the level of the bight of the loop when in the retrieved position, releasable means for holding said retrieving means in its extended position and means actuable by the hose supporting means for the nozzle end, for releasing said holding means.

3. In a hose retrieving mechanism, the combination of a hose having a nozzle on one end, means for supporting the other end of the hose, a support for the nozzle movable between nozzle supporting and nozzle rejecting positions, hose retrieving means attached to the hose intermediate the ends and having extended and retrieved positions, means for holding said retrieving means in its extended position and means conditioned by the nozzle support when in rejecting position for holding the retrieving means in its extended position.

4. In a hose retrieving mechanism, the combination of a hose having a nozzle on one end, means for supporting the other end of the hose, a support for the nozzle movable between nozzle supporting and nozzle rejecting positions, hose retrieving means attached to the hose intermediate the ends and having extended and retrieved positions, means comprising a snubbing mechanism, having released and snubbing positions, for holding said retrieving means in its extended position, and means operable by said support when it is moved to rejecting position for placing the mechanism in snubbing position.

5. In a hose retrieving mechanism, the combination of a hose having a nozzle on one end, means for supporting the other end of the hose, a support for the nozzle movable between nozzle supporting and nozzle rejecting positions, hose retrieving means attached to the hose intermediate the ends and having extended and retrieved positions, releasable means for holding said retrieving means in its extended position and means conditioned by the nozzle support when in rejecting position for holding the retrieving means in its extended position, said conditioned means being operable by said nozzle support when moving to the supporting position for releasing said holding means.

6. In a hose retrieving mechanism, the combination of a hose having a nozzle on one end, means for supporting the other end of the hose, a support for the nozzle, movable between nozzle supporting and nozzle rejecting positions, hose retrieving means comprising a flexible member attached to the hose intermediate the ends thereof, a storing device comprising yieldable means for retracting the member, said member being withdrawable therefrom by pulling on the hose, and holding means conditioned by the nozzle support when in rejecting position for preventing retraction of said member.

7. In a hose retrieving mechanism, the combination of a hose having a nozzle on one end, means for supporting the other end of the hose, a support for the nozzle, movable between nozzle supporting and nozzle rejecting positions, hose retrieving means comprising a flexible member attached to the hose intermediate the ends thereof, a storing device comprising yieldable means for retracting the member, said member being withdrawable therefrom by pulling on the hose, and holding means movable to and from member engaging position and connected to be moved to engaging position by the nozzle support when the latter is in rejecting position for preventing retraction of said member.

8. In a hose retrieving mechanism, the combination of a hose having a nozzle on one end, means for supporting the other end of the hose, a support for the nozzle movable between nozzle supporting and nozzle rejecting positions, hose retrieving means comprising a flexible member attached to the hose intermediate the ends thereof, a storing device comprising yieldable means for retracting the member, said member being withdrawable therefrom by pulling on the hose, holding means conditioned by the nozzle support when in rejecting position for preventing retraction of said member, and means actuable by said nozzle support as it moves to supporting position for rendering said holding means ineffective.

9. In a hose retrieving mechanism, the combination of a hose having a nozzle on one end, means for supporting the other end of the hose, a support for the nozzle movable between nozzle supporting and nozzle rejecting positions, a flexible member attached to the hose intermediate the ends thereof, a reel for the member, yieldable means for actuating said reel to wind up the member, a brake for the reel, means normally operative to apply the brake and means operable by the support in the nozzle supporting position for releasing the brake.

10. In a hose retrieving mechanism, the combination of a hose having a nozzle on one end, means for supporting the other end of the hose, a support for the nozzle movable between nozzle supporting and nozzle rejecting positions, a flexible member movable between extended and retrieved positions attached to the hose intermediate its ends, means normally operative to retrieve said member, brake means normally engaged with said member and adapted to hold it extended and means operable by the support when it is moved to nozzle supporting condition for releasing said brake means.

11. In a liquid dispensing apparatus, a hose, a nozzle through which liquid is dispensed, a hose retrieving mechanism comprising a flexible member attached to the hose intermediate its ends, means for normally retracting said member, additional means movable to and from engagement with said member to prevent retraction thereof, a nozzle support movable between flow starting and flow stopping positions, means actuated by the nozzle when it is moved to flow stopping position for moving said additional means from engagement with the member and an interlock mechanism actuatable to and from a position in which it prevents movement of the support to flow starting position.

12. In a liquid dispensing apparatus, a hose, a nozzle through which liquid is dispensed, a hose retrieving mechanism comprising a flexible member attached to the hose intermediate its ends, means for normally retracting said member, additional means movable to and from engagement with said member to prevent retraction thereof, a nozzle support movable between flow starting and flow stopping positions, means actuated by the nozzle when it is moved to flow stopping position for moving said additional means from engagement with the member, said additional means being actuated by the nozzle actuated means when it is moved to flow starting position for moving said additional means into engagement with the member, and an interlock mechanism actuatable to and from a position in which it prevents movement of the support to flow starting position.

13. In a liquid dispensing apparatus, a hose, a nozzle through which liquid is dispensed, a hose retrieving mechanism comprising a flexible member attached to the hose intermediate its ends, means for normally retracting said member, additional means movable to and from engagement with said member to prevent retraction thereof, a nozzzle support movable between flow starting and flow stopping positions, means actuated by the nozzle when it is moved to flow stopping position for moving said additional means from engagement with the member, an interlock mechanism actuatable to and from a position in which it prevents movement of the support to flow starting position and manually operable means for actuating said mechanism from said position.

WALTER M. HARKS.

REFERENCES CITED

The following references are of record in the file of this patent:

UNITED STATES PATENTS

| Number | Name | Date |
|---|---|---|
| 1,228,501 | Twite | June 5, 1917 |
| 1,458,115 | Caldwell | June 5, 1923 |
| 2,327,475 | Waugh | Aug. 24, 1943 |